3,098,005
ANTHELMINTIC COMPOSITION CONTAINING 2-NITRO-1-PHENYL-1-PROPENE AND PROCESS FOR USING SAME
Edward B. Hodge, Terre Haute, Ind., assignor to Commercial Solvents Corporation, New York, N.Y., a corporation of Maryland
No Drawing. Filed Feb. 23, 1961, Ser. No. 90,971
7 Claims. (Cl. 167—53)

My invention relates to a process for the destruction of parasitic nematodes in animals. More particularly my invention relates to destroying parasitic nematodes with 2-nitro-1-phenyl-1-propene as the active ingredient.

The infestation of meat-producing animals such as swine and cattle, and of pets by parasitic nematodes results in great economic loss each year. Great numbers of various nematodes such as *Ascaris suis, Oesophogostoma suis,* and *Trichuris suis* enter the alimentary tract of a host animal under normal feeding and grazing circumstances and thereupon begin their parasitic activity. These parasites seldom, if ever, result directly in the death of the host animal but often leave the animal in a weakened condition thus making it more susceptible to illness caused by other organisms. The infestation of nematodes, even in small numbers, is harmful to even the most healthy of animals causing loss of appetite with a resulting lower rate of growth.

Previously, many materials have been recommended as anthelmintic agents, the term usually given to compositions which aid in the destruction of parasitic nematodes in a living animal. A great many of these materials, however, have proven not to be practical anthelmintic agents due to the lack of ready availability, cost, failure of acceptance by the animal, lack of effectiveness in small amounts, etc. Also, some of the agents, while effective against one or several types of nematodes, prove to be relatively ineffective on other nematodes when used in practical quantities. But even more importantly, most anthelmintic agents which have none of the above mentioned drawbacks, prove to be only effective when used over long periods of time thus not only increasing the cost of their use but allowing slower weight gain or even loss of weight to the animal during the treatment period.

I have now discovered a process for ridding animals such as swine, cattle, and pets of parasitic nematodes in a relatively short period of time. My process is both safe and economical and can be used satisfactorily under normal feeding conditions. My process consists of feeding the animals small but effective amounts of 2-nitro-1-phenyl-1-propene.

The exact quantity of 2-nitro-1-phenyl-1-propene which should be ingested by the animal in a given day will vary widely and to an extent will depend upon the nature of the feed in which the compound is incorporated, the size of the animal, and the type of nematode to be expelled. Generally I have found that animals can be rid of nematodes when treated by my process in approximately two-days' feeding when from about 25 to about 200 milligrams per kilogram of body weight of the compound is ingested per day of feeding. Generally I have found optimum results are obtained when from about 50 to about 100 milligrams per kilogram of body weight of 2-nitro-1-phenyl-1-propene is utilized. If desired, however, low amounts of my anthelmintic composition in longer periods of feeding can be utilized.

My anthelmintic agent can be fed to animals in any convenient manner. For example, as part of the complete feed or as part of a feed supplement such as a protein supplement. Generally when I employ anthelmintic feed compositions containing from about 500 to about 4,000 parts per million by weight based on the weight of my anthelmintic feed composition, the animal will completely accept the feed and under normal eating habits will consume the desired daily amount of anthelmintic agent. For optimum acceptance and results, however, I prefer anthelmintic feed compositions containing from about 1,000 to about 3,000 parts per million by weight of my compound.

The following example is given to illustrate my invention, but it is not intended that my invention be limited to the procedures, amounts of active ingredients or described rations; but rather it is intended that all equivalents obvious to those skilled to the art be included within the scope of my invention.

EXAMPLE I

Six dogs know to be infested with parasitic nematodes were given 2-nitro-1-phenyl-1-propene for a three-day period during which period from 25 milligrams per kilogram of body weight to 100 milligrams per kilogram of body weight of the active anthelmintic were ingested. The feces of the animals was inspected before the start of the treatment and the number of eggs per gram of feces was counted one to three times before treatment and also a week after treatment. All feces discharged during 24 hours after treatment were suspended in sufficient amount of water and were strained through a fine wire gauze to be examined for the presence of parasitic nematodes. The following table shows the effectiveness of my novel anthelmintic:

Table

DOSE 25 MG./KG. DAILY FOR THREE DAYS

| Dog | Body Weight, kg. | Dose, mg. | Eggs/gm. (before) | Eggs/gm. (after) | No. of worms Discharged |
|---|---|---|---|---|---|
| A | 10.8 | 0.270 | 6,600 | 3,500 / 4,400 | 11 |

DOSE 50 MG./KG. DAILY FOR THREE DAYS

| B | 8.4 | 0.42 | 3,800 / 2,000 | 0 | 5 |
| C | 7.0 | 0.35 | 4,400 / 14,100 | 300 | 241 |
| D | 8.2 | 0.41 | 5,400 | 2,500 | 24 |

DOSE 100 MG./KG. DAILY FOR THREE DAYS

| E | 10.0 | 1.0 | 1,800 / 1,800 / 3,500 | 700 / 1,000 | 2 |
| F | 6.0 | 0.66 | 500 / 500 | 0 | 4 |

Now having described my invention, what I claim is:

1. An anthelmintic animal feed composition containing from about 500 to about 4,000 parts per million of 2-nitro-1-phenyl-1-propene.

2. The composition of claim 1 wherein the animal feed contains from about 1,000 to about 3,000 parts per million of 2-nitro-1-phenyl-1-propene.

3. A process for the treatment of nematode infestations which comprises administering to the host of the nematode during a daily administration period from about 25 to about 200 milligrams of 2-nitro-1-phenyl-1-propene per kilogram of body weight of the host.

4. The process of claim 3 wherein the amount of 2-nitro-1-phenyl-1-propene administered in a daily period ranges from about 50 to about 100 milligrams per kilogram of body weight.

5. A process for expelling nematodes from a host animal infested with nematodes which comprises feeding the nematode infested host a feed containing a small but effective amount of 2-nitro-1-phenyl-1-propene, the said feed being fed in amounts such that the host receives a daily feeding of from about 25 to about 200 milligrams per kilogram of body weight of the host of 2-nitro-1-phenyl-1-propene.

6. The process of claim 5 wherein the amount of 2-nitro-1-phenyl-1-propene received by the host in a daily feeding ranges from about 50 to about 100 milligrams per kilogram of body weight.

7. A process for expelling nematodes from a host animal which comprises feeding the nematode infested host a feed containing from about 500 to about 4,000 parts per million of 2-nitro-1-phenyl-1-propene, the said feed being fed in such amounts so that the host receives a daily feeding of from about 25 to about 200 milligrams per kilogram of body weight of 2-nitro-1-phenyl-1-propene.

References Cited in the file of this patent

Chem. Abst., 5th Decennial Index, subjects B–Bz, 1947–1956, pp. 1558s, col. 1.